United States Patent [19]

Marsheck et al.

[11] 3,878,046

[45] Apr. 15, 1975

[54] HYDROXYLATED PROSTAGLANDINS AND PROCESS

[75] Inventors: William Marsheck, Lake Zurich; Masateru Miyano, Morton Grove, both of Ill.

[73] Assignee: G. D. Searle & Co., Chicago, Ill.

[22] Filed: Sept. 4, 1973

[21] Appl. No.: 393,775

Related U.S. Application Data

[63] Continuation-in-part of Ser. No. 352,662, April 19, 1973, abandoned.

[52] U.S. Cl.......... 195/51 R; 260/468 D; 260/514 D
[51] Int. Cl............................................. C12b 1/00
[58] Field of Search ................................. 195/51 R

[56] References Cited
UNITED STATES PATENTS
3,788,947  1/1974  Hsu et al............................ 195/51 R

*Primary Examiner*—A. Louis Monacell
*Assistant Examiner*—Robert J. Warden
*Attorney, Agent, or Firm*—Elliot N. Schubert; John A. Dhuey

[57] ABSTRACT

Hydroxylated prostaglandin derivatives, produced by the fermentative action of bacteria of the Streptomyces genus, exhibit valuable pharmacological properties, e.g., hypotensive and anti-ulcerogenic.

3 Claims, No Drawings

HYDROXYLATED PROSTAGLANDINS AND PROCESS

This application is a continuation-in-part of our copending application Ser. No. 352,662, filed Apr. 19, 1973, now abandoned.

The present invention is concerned with novel prostaglandin derivatives and with a process for their manufacture. These novel derivatives are characterized by a hydroxy group in the octenyl sidechain and are produced by the fermentation of a compound of the following structural formula

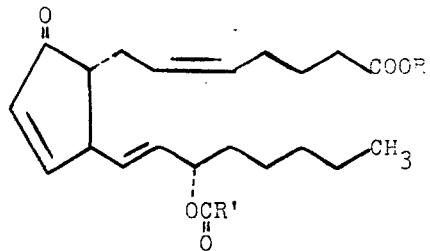

wherein R and R' are lower alkyl radicals, with a bacterium belonging to the Streptomyces genus or with the enzymes isolated therefrom. The novel products of that fermentation process are denoted by the following structural formulae

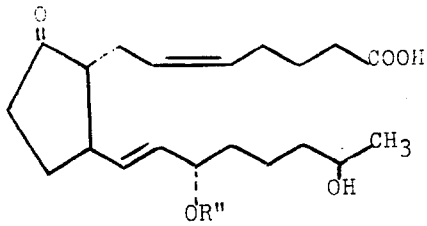

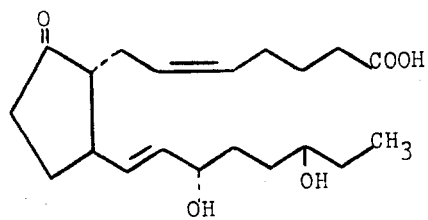

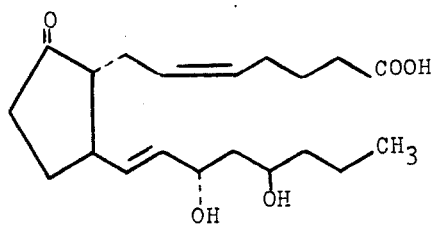

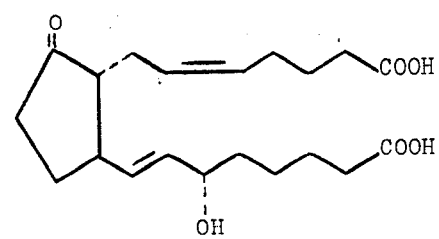

wherein R" is hydrogen or a lower alkanoyl radical.

The lower alkyl radicals comprehended in the latter structural formulae are typified by methyl, ethyl, propyl, butyl, pentyl, hexyl, heptyl and the branchedchain groups isomeric therewith.

The lower alkanoyl radical symbolized above are those of the formula

wherein R' is a lower alkyl radical.

The Streptomyces species particularly suitable for use in the instant process are typified by *Streptomyces ruber* NRRL B-1268, *Streptomyces aureofaciens* ATCC 10762, *Streptomyces albus* ATCC 11891, *Streptomyces aureus* ATCC 3309 and *Streptomyces griseocarneus* ATCC 12628. *Streptomyces ruber* NRRL B-1268 is especially preferred.

The novel compounds of the present invention are useful in consequence of their valuable pharmacological properties. They possess, for example, hypotensive and anti-ulcerogenic properties. Those properties are evidenced by activity of those compounds in the assays described in U.S. Pat. Nos. 3,479,357 and 3,696,144.

The process of the present invention includes the consecutive transformations whereby the 10,11-double bond of the starting material is reduced and a hydroxyl group is inserted at the 19-position of the molecule. Hydroxylation of prostaglandins in that position has not hitherto been described. While related 19-hydroxy prostaglandin derivatives are described by Hamberg and Samuelsson, *J. Biol. Chem.*, 241, 257 (1966) and by Bygdeman and Hamberg, *Acta. Physiol, Scand.*, 69, 320 (1967), those substances are isolated from a naturally occurring source, i.e., human seminal plasma. U.S. Pat. No. 3,504,020 discloses a specific 19-hydroxy prostanoic acid derivative, but no method for its preparation is recited.

The instant process is specifically illustrated by the reaction of methyl 15(S)acetoxy-9-oxoprosta-5-cis-10,13-trans-trienoate, a substance readily available by the extraction of coral, e.g., from the species *Plexaura homomalla*, as described by Weinheimer and Spraggins, *Tetrahedron Letters*, 5185 (1969), in a suitable medium, with *Streptomyces rubber* NRRL B-1268 to afford 15(S)-acetoxy-19-hydroxy-9-oxoprosta-5-cis-13-trans-dienoic acid and 15(S),19-dihydroxy-9-oxoprosta-5-cis-13-trans dienoic acid, which compounds are readily separated by chromatographic procedures.

As discussed hereinbefore, the present process results in the formation also, in relatively minor proportions, of 15(S),17-dihydroxy-9-oxoprosta-5-cis-13-trans-dieonic acid, 15(S),18-dihydroxy-9-oxoprosta-5-cis-13-trans-dieonic acid, and 15(S)-hydroxy-19-carboxy-20-nor-9-oxoprosta-5-cis-13-trans-dieonic acid. These derivatives are separated by standard chromatographic techniques.

Cultures of *Streptomyces aureofaciens* ATCC 10762, *Streptomyces albus* ATCC 11891, *Streptomyces aureus* ATCC 3309 and *Streptomyces griseocarneus* ATCC 12628 are available upon request from Americal Type Culture Collection, 12301 Parklawn Drive, Rockville, Md. 20852 and of *Streptomyces ruber* NRRL B-1268 from Northern Regional Research Laboratory, 1815 North University Street, Peoria, Ill. 61604.

In the practice of this invention the instant process may be effected in the growing culture of a microorganism either by adding the substrate to the culture during the incubation period or by including it in the nutrient medium prior to innoculation. Assimilable sources of carbon and nitrogen should be present in the culture medium. An adequate sterile air supply should be maintained during the conversion, for example, by the conventional techniques either of exposing a large surface of the medium to the sterile air or by passing air through a submerged culture.

Sources of nitrogenous growth promoting factors are those normally employed in such processes. They may be natural organic materials such as soy bean meal, corn steep liquor, meat extracts, peptone and/or distiller's solubles or synthetics such as nitrates and ammonium compounds.

Suitable energy source materials which may be utilized in the process of this invention include meat extracts, peptone, and the like, which serve also as nitrogen sources, or other conventional carbon containing materials such as carbohydrates of the type exemplified by glycerol, glucose, fructose, dextrose, sucrose, lactose, maltose, dextrins, starches and whey. These materials may be used either in purified states or as concentrates, such as whey concentrate, corn steep liquor, grain mashes, and the like, or as mixtures of the above. The preferred but not limiting range of concentration of the substrate in the culture is about 0.1–1.0%. The time interval required for action of the enzyme system of the microorganism employed may vary considerably, the range of 12–120 hours being practical but not limiting. The process of the present invention may be conducted at temperatures of 15°–35°, the range of 25°–30° being particularly preferred. It has been determined that the substrate can be added to the reaction mixture either in the solid form or dissolved in a suitable organic solvent such as acetone or methyl cellosolve. The substrate can also be added as a finedly divided solid. In such case, the finely divided substrate is added as an aqueous suspension containing a sufficient quantity of wetting agents suitable for dispersion of that material. Suitable wetting agents are exemplified by polyoxyethylene sorbitan monoesters such as polyoxyethylene sorbitan monooleate. Alternate methods using ultrasonic energy together with organic solvents can be used to provide finely divided substrates.

The invention will appear more fully from the examples which follow. These examples are given by way of illustration only and are not to be be construed as limiting the invention either in spirit or in scope as it will be apparent to those skilled in the art that many modifications both in materials and methods may be practiced without departing from the purpose or intent of this disclosure. Throughout these examples temperatures are given in degrees Centigrade (°C.) and relative amounts of materials in parts by weight except as otherwise noted.

EXAMPLE 1

16,000 Parts by volume of a medium consisting of 200 parts of soy peptone, 100 parts of casein hydrolysate, 20 parts of yeast extract, 100 parts of potato starch and 40 parts of calcium carbonate is charged to a 30,000 part by volume reactor and that medium is sterilized at approximately 121° for about 30 minutes. At the end of that time the medium is cooled to approximately 30° and a previously sterilized aqueous solution consisting of 100 parts of glucose dissolved in 200 parts of water is added. The medium is then cooled further to approximately 28°, whereupon 200 parts by volume of a *Sterptomyces ruber* NRRL B-1268 culture, previously shaken for 24 hours, is innoculated into the reactor. The aeration rate is set at 10 liters/minute, agitation rate at 300 revolutions/minute and the temperature maintained at approximately 28°. Foaming is controlled by the addition of a silicone anti-foam emulsion. After approximately 19 hours of agitation, 5 parts of methyl 15(S)-acetoxy-9-oxoprosta-5-cis-10,13-trans-trienoate in 40 parts by volume of acetone is added to the medium. The agitation rate is increased to approximately 350 revolutions/minute and the fermentation is continued for approximately 48 hours. At the end of that time, the pH is adjusted to approximately 4 by the addition of citric acid and the mixture is extracted with methylene chloride. The organic extract is then concentrated under reduced pressure to afford 33 parts of an oily residue. That material is purified by absorption on a silicic acid chromatographic column followed by elution with ethyl acetate-benzene mixtures. From the 15% ethyl acetate in benzene eluate there is obtained 15(S)-acetoxy-9-oxoprosta-5-cis-13-trans-dienoic acid and from the 20% ethyl acetate in benzene eluate, 15(S)-hydroxy-9-oxoprosta-5 cis-13-trans-dienoic acid. The 70% ethyl acetate in benzene eluant affords 15(S)-acetoxy-19-hydroxy-9-oxoprosta-5-cis-13-trans-dienoic acid, and the 100% ethyl acetate eluates a mixture of 15(S),19-dihydroxy-9-oxoprosta-5-cis-13-trans-dienoic acid, 15(S),18-dihydroxy-9-oxoprosta-5-cis-13-trans-dienoic acid, 15(S), 17-dihydroxy9-oxoprosta-5-cis-13-trans-dienoic acid, and 15(S)-hydroxy-19-carboxy-20-nor-9-oxoprosta-5-cis-13-trans-dienoic acid. The latter compounds are separated by readsorption on a silicic acid chromatographic column followed by elution with ethyl acetate in benzene mixtures. The 17-hydroxy, 18-hydroxy and 19-carboxy derivatives are obtained from the 50% ethyl acetate in benzene eluates and the 19-hydroxy derivatives from the 70% ethyl acetate in benzene eluate.

EXAMPLE 2

The substitution of an equivalent quantity of ethyl 1-5(S)-acetoxy-9-oxoprosta-5-cis-10,13-trans-trienoate in the procedure of Example 1 affords the identical products obtained in that Example.

EXAMPLE 3

The substitution of an equivalent quantity of 15(S)-acetoxy-9-oxoprosta-5-cis-10,13-trienoic acid in the procedure of Example 1 affords the identical products obtained in that Example.

What is claimed is:

1. In a process for producing a compound of the formula

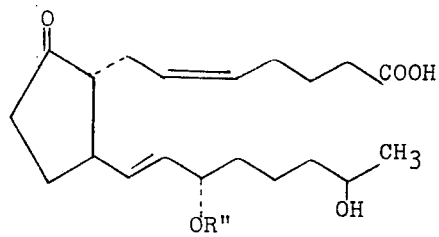

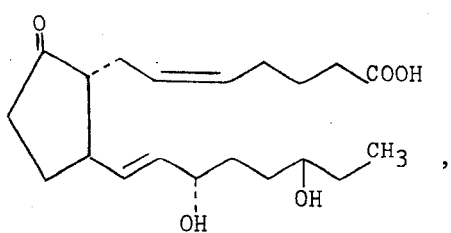

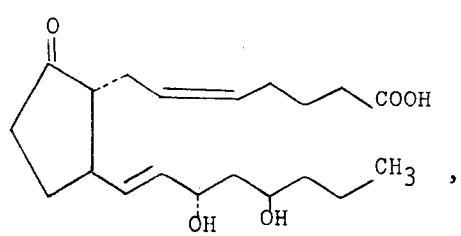

or 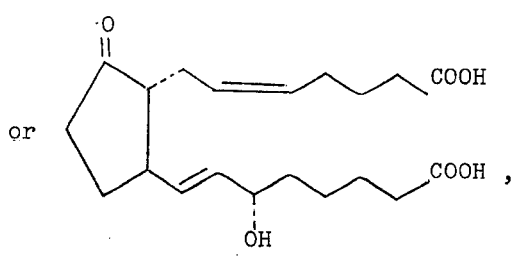

wherein R'' is hydrogen or a lower alkanoyl radical, the step which comprises subjecting a compound of the formula

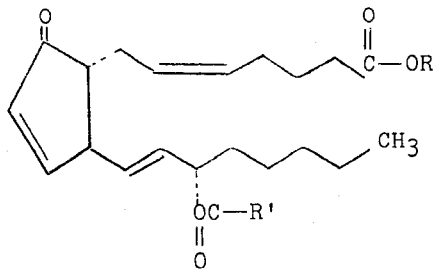

wherein R is hydrogen or a lower alkyl radical and R' is a lower alkyl radical, in a nutrient medium, to the fermentative action of a bacterium of the Streptomyces genus.

2. As in claim 1, the step which comprises subjecting a compound of the formula

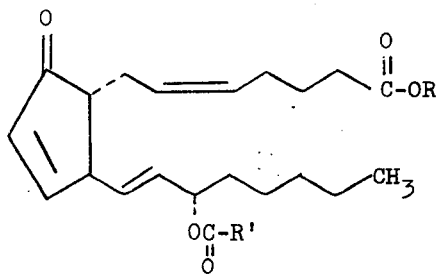

wherein R is hydrogen or a lower alkyl radical and R' is a lower alkyl radical, in a nutrient medium, to then fermentative action of a Streptomyces bacterium, selected from the group consisting of *Streptomyces ruber* NRRL B-1268, *Streptomyces, aureofaciens* ATCC 10762, *Streptomyces albus* ATCC 11891, *Streptomyces aureus* ATCC 3309, and *Streptomyces griseocarneus* ATCC 12628.

3. As in claim 1, the step which comprises subjecting a compound of the formula wherein R is hydrogen or a lower alkyl radical and R' is a lower alkyl radical, in a nutrient medium, to the fermentative action of *Streptomyces ruber* NRRL B-1268.

* * * * *